(12) United States Patent
Van Der Wulp

(10) Patent No.: US 6,704,063 B1
(45) Date of Patent: Mar. 9, 2004

(54) SYSTEM OF APPARATUS AND PERIPHERALS

(75) Inventor: Michael J. J. H. Van Der Wulp, Hoogstraten Meer (BE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/333,634

(22) Filed: Jun. 15, 1999

(30) Foreign Application Priority Data

Jun. 17, 1998 (EP) .............................. 98202017

(51) Int. Cl.[7] .............................................. H04N 5/44
(52) U.S. Cl. ...................... 348/734; 348/730; 713/324; 713/320
(58) Field of Search ................ 348/552, 554, 348/558, 705, 706, 730, 734; 345/211, 212; 713/300, 310, 320, 321–324, 330, 340; 340/333, 693.1, 693.3, 815.6, 825.69, 825.72; 725/80, 81, 85; 728/131, 133, 139, 141, 151, 153; H04N 5/44

(56) References Cited

U.S. PATENT DOCUMENTS

| | | | | |
|---|---|---|---|---|
| 3,603,732 A | * | 9/1971 | George .................... 348/730 |
| 5,193,208 A | * | 3/1993 | Yokota et al. ................ 725/80 |
| 5,231,493 A | * | 7/1993 | Apitz ........................ 348/468 |
| 5,367,316 A | * | 11/1994 | Ikezaki ....................... 345/158 |
| 5,539,391 A | * | 7/1996 | Yuen .......................... 348/734 |
| 5,736,873 A | * | 4/1998 | Hwang ......................... 327/41 |
| 5,774,548 A | * | 6/1998 | Bando et al. ................ 380/212 |
| 5,787,259 A | * | 7/1998 | Haroun et al. ............ 348/14.04 |
| 5,838,983 A | * | 11/1998 | Atkinson .................... 713/322 |
| 5,894,331 A | * | 4/1999 | Yang ........................... 348/581 |
| 5,900,867 A | * | 5/1999 | Schindler et al. ........... 345/169 |
| 5,944,828 A | * | 8/1999 | Matsuoka ................... 713/323 |
| 5,978,923 A | * | 11/1999 | Kou ............................ 713/323 |
| 5,995,155 A | * | 11/1999 | Schindler et al. ........... 348/460 |
| 6,000,035 A | * | 12/1999 | Matsushima et al. ....... 713/320 |
| 6,009,529 A | * | 12/1999 | Park ............................ 713/320 |
| 6,039,702 A | * | 3/2000 | Cutler et al. .................. 601/15 |
| 6,054,981 A | * | 4/2000 | Kimoto et al. .............. 345/211 |
| 6,088,809 A | * | 7/2000 | Atkinson .................... 713/324 |
| 6,105,143 A | * | 8/2000 | Kim ............................ 713/324 |
| 6,121,962 A | * | 9/2000 | Hwang ........................ 345/211 |
| 6,202,212 B1 | * | 3/2001 | Sturgeon et al. ............ 345/157 |
| 6,285,406 B1 | * | 9/2001 | Brusky ........................ 348/552 |
| 6,341,195 B1 | * | 1/2002 | Mankovitz et al. ......... 348/468 |
| 6,509,911 B1 | * | 1/2003 | Shimotono ................. 345/761 |
| 2002/0080163 A1 | * | 6/2002 | Morey ......................... 345/727 |

FOREIGN PATENT DOCUMENTS

| EP | 0785679 A2 | 7/1997 |
|---|---|---|
| WO | 9616512 A1 | 5/1996 |

* cited by examiner

Primary Examiner—Michael H. Lee
Assistant Examiner—Jean W. Désir
(74) Attorney, Agent, or Firm—Laurie E. Gatham

(57) ABSTRACT

The invention relates to an apparatus comprising control means (114) for controlling functions of the apparatus in response to user commands, the apparatus being connectable to peripherals through communication means (113). The apparatus enables a user to easily control whether a command is sent to the apparatus only, or simultaneously to the apparatus and its peripherals. In this way, a user can easily and simultaneously accomplish tasks, which are common to the apparatus and one or more of its peripherals.

20 Claims, 2 Drawing Sheets

SYSTEM OF APPARATUS AND PERIPHERALS

This application claims priority to European Patent Application No. 98202017.4 filed Jun. 17, 1998.

FIELD OF THE INVENTION

The invention relates to an apparatus comprising control means for controlling a function of the apparatus in response to a user command, the apparatus being connectable to a peripheral and the control means being adapted to send a control command to the peripheral in response to said user command for controlling a similar function of the peripheral.

The invention further relates to a system comprising an apparatus and a peripheral, the apparatus comprising control means for controlling a function of the apparatus in response to a user command, the apparatus being connectable to the peripheral and the control means being adapted to send a control command to the peripheral in response to said user command for controlling a similar function of the peripheral.

The invention further relates to a method of controlling an apparatus and a peripheral, comprising the steps of controlling a function of the apparatus in response to a user command and sending a control command to the peripheral in response to said user command for controlling a similar function of the peripheral.

BACKGROUND OF THE INVENTION

Audio and video systems are known which comprise audio and video devices, one of which is designated as the main device and the other ones as peripheral devices. For example, in a video system, the television receiver is designated as the main device, and devices such as a video recorder, a video disc player and a settop box are designated as peripheral devices. Each device has its own control means, e.g. a remote control unit, for controlling its functions in response to user commands. The main device often recognizes some commands for controlling functions of the system as a whole. For example, the remote control unit of a known television receiver comprises a button for putting all devices of the system in the standby state. Pressing said button instructs the television receiver to send control commands to invoke the standby function of the respective peripherals, after which the standby function of the television receiver itself is invoked. Beside a button for the system standby function, the remote control unit of the known television receiver has another button for invoking the standby function of the television receiver exclusively. The standby function is only one example of functions which are common to all devices, and which are regularly required to be accomplished on multiple devices simultaneously.

OBJECT AND SUMMARY OF THE INVENTION

It is an object of the invention to provide an apparatus which enables a user to easily control whether a function is invoked either on the apparatus only or simultaneously on the apparatus and one or more of its peripherals, without the need for a duplicate control for each function. To achieve this object, the apparatus according to the invention is characterized in that the control means further comprise user operable means for assuming a first state and a second state, the control means being adapted to refrain from sending the control command in the first state and send the control command in the second state. By adding only one user control for selecting either the first or the second state, a whole range of functions can be accomplished on the apparatus only or simultaneously on the apparatus and one or more of its peripherals.

The selection of either the first or the second state can be accomplished in various ways. A straightforward approach would be a toggle for switching between the two states, both applying to subsequent user commands. In a preferred embodiment, as defined in claim 2, the first state is a default state. For assuming the second state, e.g. a dedicated button could be applied, which has to be pressed just before or after the button which actually controls the function to be accomplished. An apparatus applying a more advantageous approach is disclosed in claims 3 and 4, whereby a user needs to operate only one button, namely the button which controls the function to be accomplished, the operation of the button being in an iterated or prolonged way, respectively.

A function which is common to many devices is the standby function. The approaches of claims 3 and 4 pose a problem for this function, because as soon as the main apparatus assumes the standby state, the control means for processing the iterated or prolonged operation of the standby button and the communication means for sending a control command to the peripheral are not operational anymore. Claim 5 discloses an embodiment of the apparatus according to the invention which, in addition to the normal standby state, has a semi-standby state wherein at least the control means and the communication means remain active. This semi-standby state is maintained for a predetermined period of time to enable the iterated or prolonged operation of the standby button. After that, the apparatus assumes the normal standby state.

For all systems of devices having a standby state, the invention can be applied to the power-on function as well, as disclosed in claim 8. If both the apparatus and a peripheral comprise a tuner for tuning to a respective one of a plurality of signal sources, the invention can be applied to the tune function, enabling a user to tune both devices to the same signal source, as disclosed in claim 9. Devices which comprise a tuner often feature a plurality of presets, each having a name and being adapted to store tuning data of a respective one of the plurality of signal sources. The invention can be applied to the function for storing the tuning data, as disclosed in claim 10. This enables a user to easily program the presets of both devices in the same way. An advantageous embodiment is characterized in that the apparatus is a television receiver and the peripheral is a video recorder. For such a system it is often convenient to have both devices tuned to the same channel, while most users prefer equally named presets to contain tuning data for the same channel.

It is to be noted that WO 96/16512 discloses a switching device for e.g. audio or video equipment, comprising a standby button for putting all devices in the standby state simultaneously. The switching device enables a user to disconnect the devices completely from the power supply by repeatedly or prolonged pressing of the standby button. Hence, the command for switching off the devices, sent in response to the repeated or prolonged pressing of the standby button, does not invoke a function which is similar to the function invoked by the original command, i.e. the standby function. Furthermore, the command for switching off the devices invokes a function of the known switching device, causing it to switch off the power supply of the connected devices, hence no regular function of said devices is invoked.

The invention can be profitably applied to television receivers, but it can be applied equally well to, for instance, radio receivers.

DESCRIPTION OF EMBODIMENTS

Figure 1:
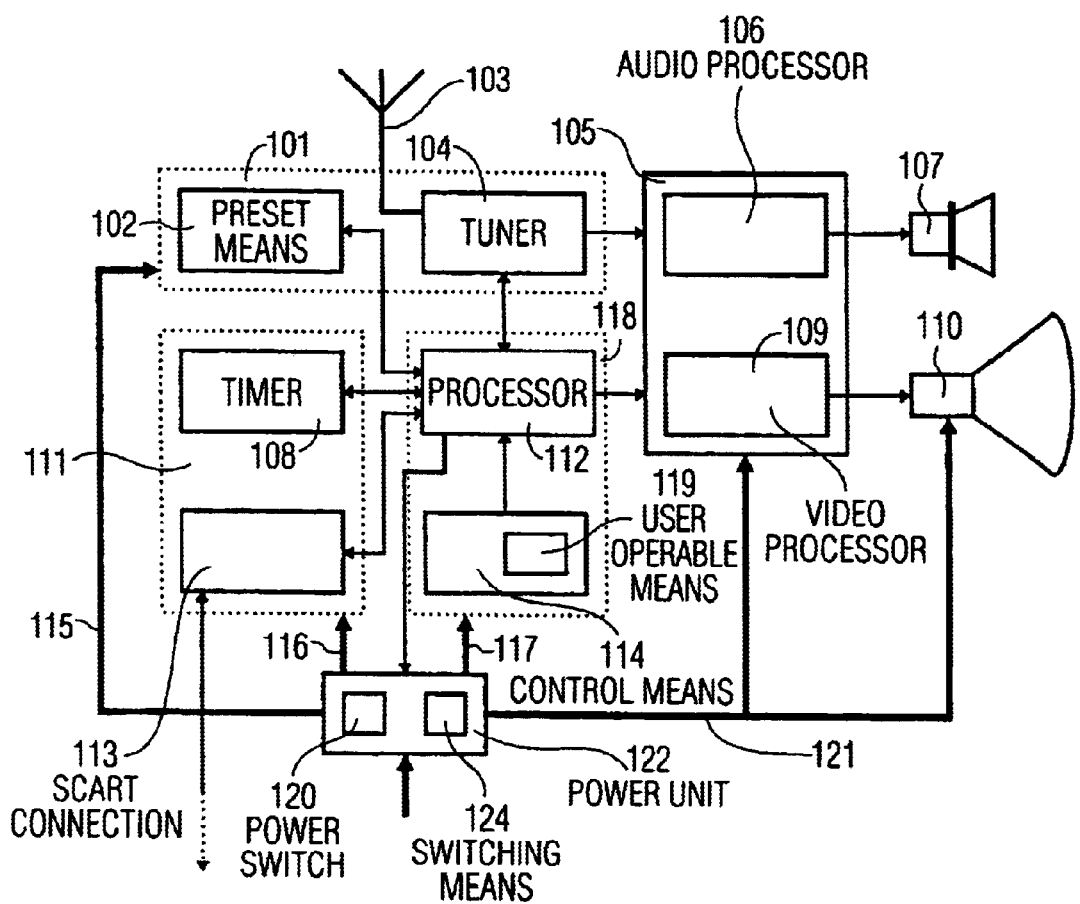
FIG. 1 shows a diagram of a television receiver as an embodiment of the apparatus according to the invention.

FIG. 1 shows a diagram of a television receiver as an embodiment of the apparatus according to the invention. A plurality of TV-channels is received from the atmosphere by an antenna 103 or, alternatively, from a cable network. One of the received channels is selected by a tuner 104. The video and audio signals are transmitted to a signal processor 105. The audio signal is further processed by an audio processor 106 and a loudspeaker 107. The video signal is further processed by a video processor 109 and presented on a screen 110. The signal processor 105 can also process audio and video signals obtained from a microprocessor 112, e.g. teletext graphics, or signals from a VCR or a camera (not shown), obtained via a SCART connection 113.

A power unit 122 receives electrical power from a network 123. The power can be distributed to a group of components 111 which includes the SCART connection 113 and a timer 108, a group 118 including the microprocessor 112, and control means 114, and furthermore to the signal processor 105, the screen 110 and a group of components 101 including preset means 102 and the tuner 104, through wires 115, 116, 117 and 121, respectively. The power unit 122 comprises a power switch 120 for disconnecting the TV-set entirely from the network 123, and switching means 124 for switching the power supply of the groups 101, 111 and 118, the signal processor 105, and the screen 110 in a mutually independent way.

The microprocessor 112 communicates with the preset means 102, the tuner 104, the signal processor 105, the timer 108, the control means 114, the SCART connection 113 and the power unit 122. The microprocessor 112 receives commands from the control means 114, e.g. for controlling the tuner 104 to select a particular TV channel, or to put the television receiver in a standby mode.

When the TV-set is in the stand-by mode, the group 118, comprising the control means 114 and the microprocessor 112, is still powered by the power unit 122 and ready to receive signals from a remote control unit (not-shown). Upon receiving an appropriate signal from the remote control unit, the control means 114 send a signal to the microprocessor 112, which controls the switching means 124 in such a way that the groups 101 and 111, the signal processor 105 and the screen 110 are powered. Another signal from the remote control unit might be dedicated to initiate the standby mode again, switching off the power supply to the groups 101 and 111, the signal processor 104 and the screen 110, but preserving the power supply to the group 118.

Figure 2:
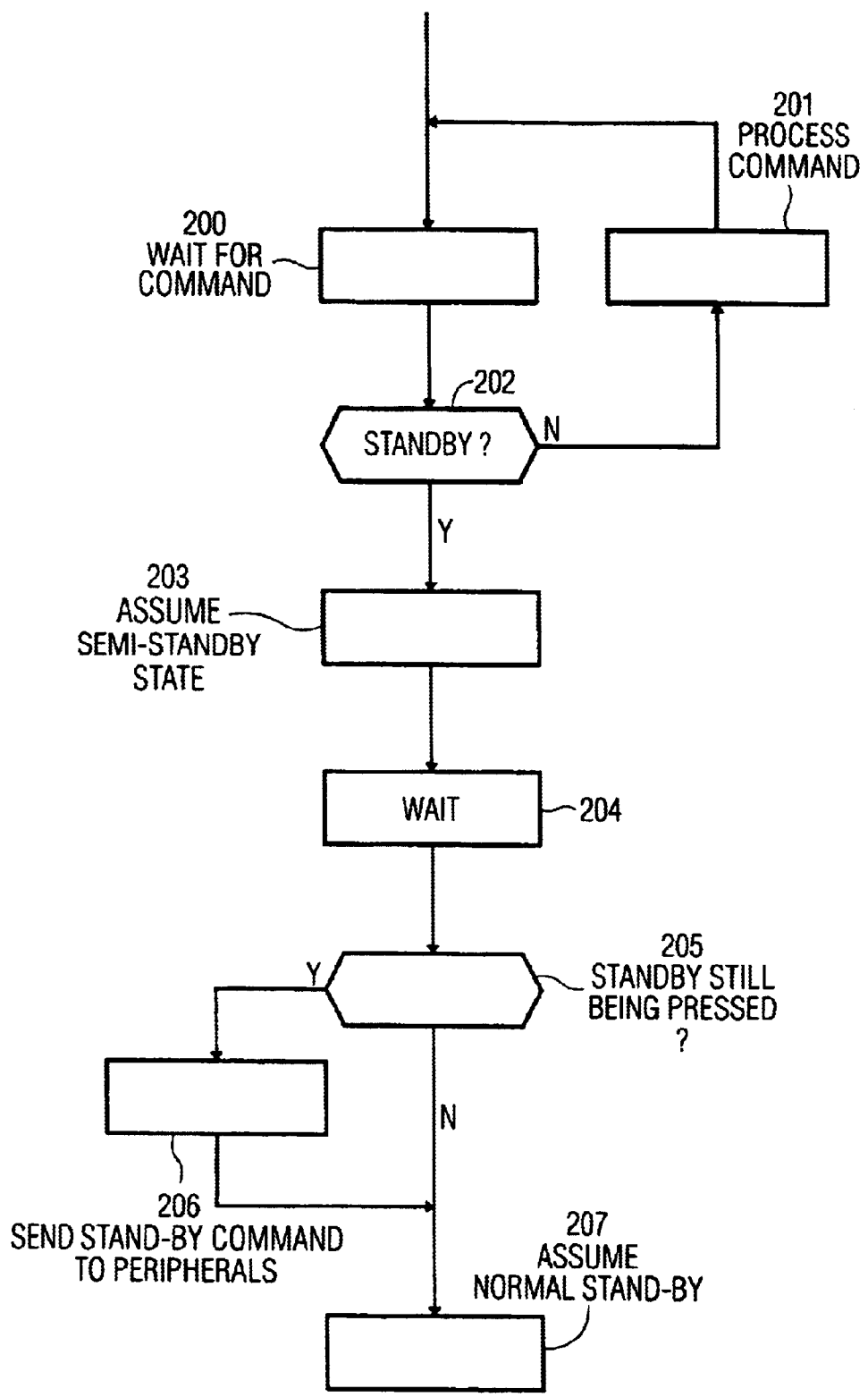
FIG. 2 shows a flow chart of the command processing process of an embodiment of the apparatus according to the invention.

When the control means 114 receive a user command, e.g. activated by a button on the remote control unit, the command is sent to the microprocessor 112 which invokes a corresponding function. Functions are implemented in software and stored in memory means (not shown) which the microprocessor 112 has access to. The control means 114 comprise user-operable means 119 for assuming a first state and a second state, which determine whether the command will also be sent to peripherals connected to the SCART connection 113, e.g. a VCR (not shown). By default, the control means assumes the first state, causing commands to invoke functions of the television receiver only. The user-operable means 119 check whether the button on the remote control remains being pressed or is pressed a second time within a predetermined period of time, e.g. 3 seconds, which period of time is measured by means of the timer 108 and the microprocessor 112. When that condition is fulfilled, the control means assume the second state, causing the command to be sent to the peripherals too. After the command has been processed, the control means assume the first state again. If the command happens to be a standby command, the television receiver assumes a semi-standby mode, differing from the normal standby mode in that the group 111, comprising the timer 108 and the SCART connection 113 remain operational. For the user, there need not be a perceptible difference with the normal standby mode, but some visible indication, e.g. a LED, could be applied to provide an indication. By first assuming a semi-standby mode, the timer. 108 remains available for measuring said period of time and the SCART connection 113 for transporting the command to the peripherals. FIG. 2 shows a flow chart of the command processing process as described above. In a step 200, the control means wait for a command to be processed. A test 202 determines whether a received command is a standby command. If the test 202 fails, the command is regularly processed in a step 201. If the test 202 succeeds, a step 203 is performed, wherein the apparatus assumes the semi-standby state as described hereinbefore. After that, a step 204 is performed which initiates a wait state of 3 seconds. After this period of time, a test 205 determines whether the standby button is still being pressed. If the test 205 fails, the apparatus assumes the normal standby state in a step 207. If the test 205 succeeds, step 207 is preceded by a step 206 wherein a standby command is sent to the peripherals.

The invention can be applied to various commands, such as power-on, selecting a preset of the preset means 102, or programming the preset means 102 by storing tuning data of a particular TV channel into a respective preset position. Presets are often selected by means of numerical keys on the remote control unit. A time-out on the numerical keys for invoking the second state might interfere with the input procedure of 2-digit preset numbers. To avoid such problems, the remote control unit could comprise an additional button for invoking the second state. If said button is pressed just before a regular command, e.g. selecting a preset, the command is sent to the peripherals too. If no regular command is entered within e.g. 3 seconds, the pressing of said additional button has no effect.

In summary, the invention relates to an apparatus comprising control means (114) for controlling functions of the apparatus in response to user commands, the apparatus being connectable to peripherals through communication means (113). The apparatus enables a user to easily control whether a command is sent to the apparatus only, or simultaneously to the apparatus and its peripherals. In this way, a user can easily and simultaneously accomplish tasks, which are common to the apparatus and one or more of its peripherals.

What is claimed is:

1. An apparatus having a standby state and comprising:
   control means for controlling a function of the apparatus in response to a user command, wherein the apparatus is adapted for selective connection to a peripheral, and wherein the control means is adapted to send a control command to the peripheral in response to an additional user command for controlling a similar function of the peripheral within a predetermined period of time following the user command; and communication means for transporting the control command to the peripheral, wherein the apparatus further has a semi-standby state wherein at least the control means and the communication means are active, the function of the apparatus and the similar function of the peripheral is a standby function, and the apparatus is adapted to assume the semi-standby state after said user command, and to assume the standby state after said predetermined period.

2. An apparatus as claimed in claim 1, wherein the control means is adapted to refrain from sending the control command if the additional user command is not received within the predetermined period of time.

3. An apparatus as claimed in claim 1, wherein said user command comprises pressing a button, wherein the additional user command comprises pressing the button a second time within the predetermined period of time.

4. An apparatus as claimed in claim 1, wherein said user command comprises pressing a button, wherein the additional user command comprises holding the button down for the predetermined period of time.

5. An apparatus as claimed in claim 1, wherein the apparatus is a television receiver.

6. A system comprising an apparatus and a peripheral, the apparatus having a standby state and comprising:

control means for controlling a function of the apparatus in response to a user command, wherein the apparatus is adapted for selective connection to a peripheral, and wherein the control means is adapted to send a control command to the peripheral in response to an additional user command for controlling a similar function of the peripheral within a predetermined period of time following the user command; and communication means for transporting the control command to the peripheral, wherein the apparatus further has a semi-standby state wherein at least the control means and the communication means are active, the function of the apparatus and the similar function of the peripheral is a standby function, and the apparatus is adapted to assume the semi-standby state after said user command, and to assume the standby state after said predetermined period.

7. A system as claimed in claim 6, wherein the apparatus is activatable in response to a user command while the apparatus is in a stand-by state.

8. A system as claimed in claim 6, the apparatus and peripheral comprising tuning means for tuning to a respective one of a plurality of signal sources, wherein the control means is adapted for tuning the apparatus and the peripheral, respectively, to the same respective signal source.

9. A system as claimed in claim 8, the apparatus and the peripheral comprising a plurality of presets, each of which have a name and are adapted to store tuning data of a respective one of the plurality of signal sources, wherein the control means is further adapted for storing tuning data of the same respective signal source into a preset of the apparatus and a preset of the peripheral, respectively, said preset of the apparatus and said preset of the peripheral having the same name.

10. A system as claimed in claim 6, wherein the apparatus is a television receiver and the peripheral is a video recorder.

11. The system of claim 7, wherein the control means is adapted to send a control command to activate the peripheral in response to an additional user command within a predetermined period of time following activation of the apparatus from the standby mode.

12. The system as claimed in claim 6, wherein said user command comprises pressing a button, and wherein the additional user command comprises pressing the button a second time within the predetermined period of time.

13. The system as claimed in claim 6, wherein said user command comprises pressing a button, and wherein the additional user command comprises holding the button down for the predetermined period of time.

14. A method of controlling an apparatus and a peripheral, comprising the steps of:

receiving, in a control means of the apparatus, a user command instructing the apparatus to enter a standby state;

placing the apparatus in a semi-standby state in which the control means and a communication means for transporting a control command to the peripheral remain active;

placing the apparatus in a standby state if no additional user command is received within a predetermined period of time; and transporting by the communications means of a control command instructing the peripheral to enter a standby state if a predetermined additional user command is received within the predetermined period of time.

15. The method as claimed in claim 14, wherein the apparatus is a television receiver and the peripheral is a video recorder.

16. The method as claimed in claim 15, wherein the peripheral is a video recorder.

17. The method as claimed in claim 14, wherein the user command is generated by the activation of a switch by the user.

18. The method as claimed in claim 17, wherein the switch is a button on a remote-control device.

19. The method of claim 14, further comprising the steps of:

receiving, in a control means of the apparatus, a user command instructing the apparatus to leave the standby state and enter an operational state; and placing the apparatus in the operational state.

20. The method of claim 19, further comprising the step of transporting by the communications means of a control command instructing the peripheral to leave the standby state and enter an operational state if a predetermined additional user command is received within the predetermined period of time.

* * * * *